(12) United States Patent
Graham et al.

(10) Patent No.: US 7,472,478 B2
(45) Date of Patent: Jan. 6, 2009

(54) ADAPTIVE MACHINING AND WELD REPAIR PROCESS

(75) Inventors: James H. Graham, Sun City, AZ (US); Jeffrey Reinwand, Collinsville, OK (US); Roger G. Coriell, Tempe, AZ (US); Kevin Lytle, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 603 days.

(21) Appl. No.: 10/976,726

(22) Filed: Oct. 29, 2004

(65) Prior Publication Data
US 2006/0090336 A1    May 4, 2006

(51) Int. Cl.
*B23P 6/00* (2006.01)
(52) U.S. Cl. .................. 29/888.021; 29/888; 29/888.02; 703/2; 703/9
(58) Field of Classification Search .... 29/889–889.722; 703/2, 9
See application file for complete search history.

(56) References Cited

U.S. PATENT DOCUMENTS

| | | | |
|---|---|---|---|
| 4,995,087 A | 2/1991 | Rathi et al. | |
| 5,047,966 A | 9/1991 | Crow et al. | |
| 5,285,572 A | 2/1994 | Rathi et al. | |
| 5,913,555 A | 6/1999 | Richter et al. | |
| 6,594,533 B2 | 7/2003 | Phillips et al. | |
| 6,676,344 B1 | 1/2004 | Amatt | |
| 6,701,615 B2 | 3/2004 | Harding et al. | |
| 6,912,446 B2 * | 6/2005 | Wang et al. ................. | 700/193 |
| 7,239,990 B2 * | 7/2007 | Struijs ........................... | 703/2 |
| 2002/0128790 A1 | 9/2002 | Woodmansee | |
| 2004/0083024 A1 | 4/2004 | Wang | |
| 2004/0191064 A1 | 9/2004 | Guo | |

FOREIGN PATENT DOCUMENTS

| | | |
|---|---|---|
| EP | 1129813 A1 | 9/2001 |
| EP | 1207004 | 5/2002 |
| EP | 1254738 A2 | 11/2002 |

OTHER PUBLICATIONS

PCT International Search Report PCT/US2005/038948, Dec. 14, 2006.

* cited by examiner

*Primary Examiner*—Rick K Chang
(74) *Attorney, Agent, or Firm*—Ingrassia Fisher & Lorenz, P.C.

(57) ABSTRACT

An apparatus and method are provided for an adaptive machining and weld repair process for repairing airfoils, damage to an airfoil leading edge and tip. First, damaged material is machined away from a damaged airfoil edge so as to expose a weld surface. New material is laser deposited on the weld surface so as to create a weld-repaired airfoil having actual dimensions. The actual dimensions of the weld-repaired airfoil are automatically measured using a CMM system so as to generate an actual geometry. The actual geometry is deformed so as to develop a deformation geometry. The component is then machined according to the deformation geometry.

16 Claims, 5 Drawing Sheets

ADAPTIVE MACHINING AND WELD REPAIR PROCESS

FIELD OF THE INVENTION

The present invention relates to welding. More particularly the invention relates to the apparatus and techniques used for adaptive machining and weld repair. The invention further relates to adaptive machining and weld repair as related to impellers and blisks used in gas turbine engines.

BACKGROUND OF THE INVENTION

Turbine engines are used as the primary power source for many types of aircrafts. The engines are also auxiliary power sources that drive air compressors, hydraulic pumps, and industrial gas turbine (IGT) power generation. Further, the power from turbine engines is used for stationary power supplies such as backup electrical generators for hospitals and the like.

Most turbine engines generally follow the same basic power generation procedure. Compressed air generated by axial and/or radial compressors is mixed with fuel and burned, and the expanding hot combustion gases are directed against stationary turbine vanes in the engine. The vanes turn the high velocity gas flow partially sideways to impinge on the turbine blades mounted on a rotatable turbine disk. The force of the impinging gas causes the turbine disk to spin at high speed. Jet propulsion engines use the power created by the rotating turbine disk to draw more air into the engine and the high velocity combustion gas is passed out of the gas turbine aft end to create forward thrust. Other engines use this power to turn one or more propellers, fans, electrical generators, or other devices.

In an attempt to increase the efficiencies and performance of contemporary gas turbine engines generally, engineers have progressively pushed the engine environment to more extreme operating conditions. The harsh operating conditions of high temperature and pressure that are now frequently specified place increased demands on engine component-manufacturing technologies and new materials. Indeed the gradual improvement in engine design has come about in part due to the increased strength and durability of new materials that can withstand the operating conditions present in the modern gas turbine engines. With these changes in engine materials, there has arisen a corresponding need to develop new repair methods appropriate for such materials.

Through normal service, there arises a need to repair engine components such as turbine impellers and blisks. With respect to blisks, blade leading edge damage is one of the most common failures. The leading edge is subject to foreign object damage or erosion after a period of service time. A significant savings can be realized if the damaged blades can be repaired and returned to service.

Historically, the repair has been accomplished by machining away the damaged portion of the blades. Welding material was then manually deposited over the areas that had been machined away. The component was then machined by referencing a nominal model geometry in an attempt to reproduce the originally designed dimensions. Then, the component was hand finished, manually machined, in order to put the component in a serviceable condition.

However, there are shortcomings associated with the historical repair method. The method requires leaving a significant amount of remaining material (stock on) after machining, which must be removed by a hand finishing process. This is due to the fact that no component, or blade within a component, is exactly at a nominal condition. The manual nature of the hand finishing process increases the cost and processing time of the repair. Finally, the method results in significant scrap. Thus, a need exists for the development of improved machining and weld repairing methods.

The option of throwing out worn engine components such as turbine blisks and replacing them with new ones is not an attractive alternative. Blisks are extremely expensive due to their costly material and manufacturing process. Consequently there is a strong financial need to find an acceptable and efficient repair method for engine components.

Hence, there is a need for a repair method that addresses one or more of the above-noted drawbacks and needs. Namely, a repair method is needed that can restore the approximate geometry, dimension and desired properties of degraded gas turbine engine components and/or a method that allows an efficient repair of worn airfoil surfaces and/or a repair method that minimizes the amount of stock on material on a welded piece after machining. Finally, it would be desired to provide a repair method that by virtue of the foregoing is therefore less costly as compared to the alternative of replacing worn parts with new ones. The present invention addresses one or more of these needs.

SUMMARY OF THE INVENTION

The present invention provides an apparatus and methods for use in an adaptive weld repair process. In one embodiment, and by way of example only, there is provided a method for restoring a worn engine component comprising the steps of: removing damaged material from a worn surface of the component; depositing new material on the surface; measuring the component at the surface, including measuring with a CMM system; developing a deformation component geometry based on component measurements; and machining the component to the deformation component geometry.

In a further embodiment, still by way of example only, there is provided a method for restoring a worn edge of an airfoil comprising the steps of: machining away damaged material from a damaged airfoil edge so as to expose a weld surface; laser depositing new material on the weld surface so as to create a weld-repaired airfoil; automatically measuring the actual dimensions of the weld-repaired airfoil using a CMM system so as to generate an actual geometry; deforming the actual geometry so as to develop a deformation geometry; and machining the component according to the deformation geometry. The method may further comprise the step of converting the deformation geometry to a CNC machining data. The step of machining the component may also comprise automated machining according to a CNC machining data. The machined feature may comprise a leading edge, top edge, or trailing edge.

In still a further embodiment, and still by way of example only, there is provided a method for restoring a worn edge of an airfoil comprising the steps of: machining away damaged material from a damaged airfoil edge so as to expose a welding area; laser depositing new material on the welding area so as to create a weld-repaired airfoil; defining a set of streamlines; defining a set of cross curves that intersect streamlines thereby establishing surface points at each such intersection; associating nominal surface data with each surface point; defining a set of inspection nominal points that fall on streamlines and cross curves; defining a set of surfaces of rotation (or alternatively, defining inspection nominal points where surfaces of rotation intersect streamlines and cross curves); automatically measuring the actual dimensions of the airfoil using a CMM system at each inspection nominal point to establish a shape deviation; interpolating shape deviation data with reference to the surface points so as to create a deformation geometry; converting the deformation geometry to a machine operable code; machining the component according to the deformation geometry; and hand finishing the airfoil. Machining the component may comprise machining the component so as to leave less than 0.005 inch of material stock on. The interpolation may be a linear or polynomial interpolation. The method may also include calculating surface normal vectors at each surface point and interpolating along a surface normal vector. Additionally the method may include establishing a first surface point on a streamline and cross curve a defined distance from an edge feature and assigning a deviation to surface points prior to the first point that is equal to the deviation of the first surface point.

Other independent features and advantages of the adaptive machining and weld repair process will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

It has now been discovered that an improved machining and weld repair process can be achieved through the use of adaptive machining technology. In overview, the process first machines away damaged portions of an airfoil. Filler material is then added to the machined area through a process such as laser welding. At this point, the actual profile of the welded airfoil is measured, for example, by using a tool such as a Coordinate Measuring Machine. The data of the actual repaired profile is then used to generate a "deformation" profile, an airfoil profile that approximates the ideal shape of the airfoil. The airfoil is then machined to produce the deformation profile. The adaptive technology minimizes the amount of stock on material that needs to be removed by hand. The technique significantly reduces costly manual processing.

Figure 1:
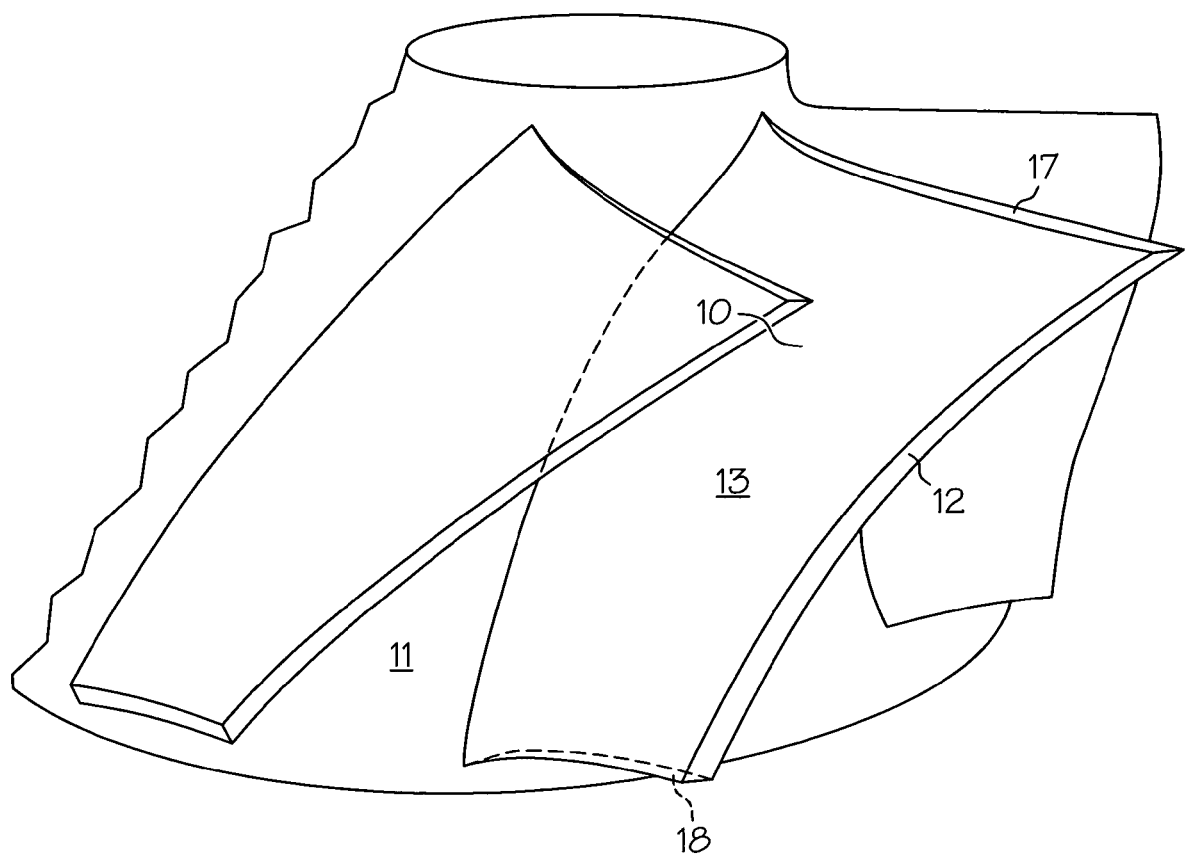
FIG. 1 is a perspective view of a gas turbine engine blisk that may be repaired according to an embodiment of the present invention.

A representative airfoil 10 of a turbine blisk or impeller is illustrated in FIG. 1. In actuality such a blade may have a different geometry and design, depending on engine model and its application. Nevertheless, for purposes of the explanation herein, FIG. 1 provides an acceptable model of an airfoil to be repaired according to the adaptive machining process. For a typical aero-engine, a turbine blisk airfoil is typically a few inches in length. Airfoil 10 is characterized by a complex geometry that changes in three dimensions. A gas turbine airfoil may be welded to, or cast in unitary form, with hub 11. In an engine assembly multiple such turbine airfoils are positioned in adjacent circumferential position along the hub or rotor disk. Multiple blisks or other rotor assemblies may be sequentially positioned in the engine. Airfoil 10 is a cuplike structure that includes a concave face 13 and a convex face (not shown) on the reverse side of the airfoil. Airfoil 10 extends radially outwardly from the hub. A top edge 12 defines the radial end of the airfoil.

In operation, gases impinge on concave face 1.3 of airfoil 10 thereby providing the driving force for the turbine engine. Pressure develops on concave face 13 while suction develops on the convex face. This force acting on the airfoil thereby spins hub 11. Turbine airfoil 10 also includes leading edge 17 and trailing edge 18 which represent the edges of the airfoil that firstly and lastly encounter an air stream passing around it. Leading edge 17 is subject to wear and degradation. Partly this arises from debris and contaminants carried in the airstream. This debris impacts leading edge 17 at high velocity thus leading to nicks, wear, and erosion, all of which impair the engine performance. Top edge 12 is also subject to wear due to both particulate erosion and rubbing against adjacent engine structures. Other portions of the airfoil, including trailing edge 18, are subject to erosion due to the harsh environment of the engine.

Airfoils are thus subject to repair or replacement. One repair scheme calls for the removal of a blisk or impeller after a given period of use. At this time damage to the airfoils may be repaired. As stated, a typical repair calls for the repair and restoration of the airfoil leading edge 17, top edge 12, and trailing edge 18.

Figure 2:
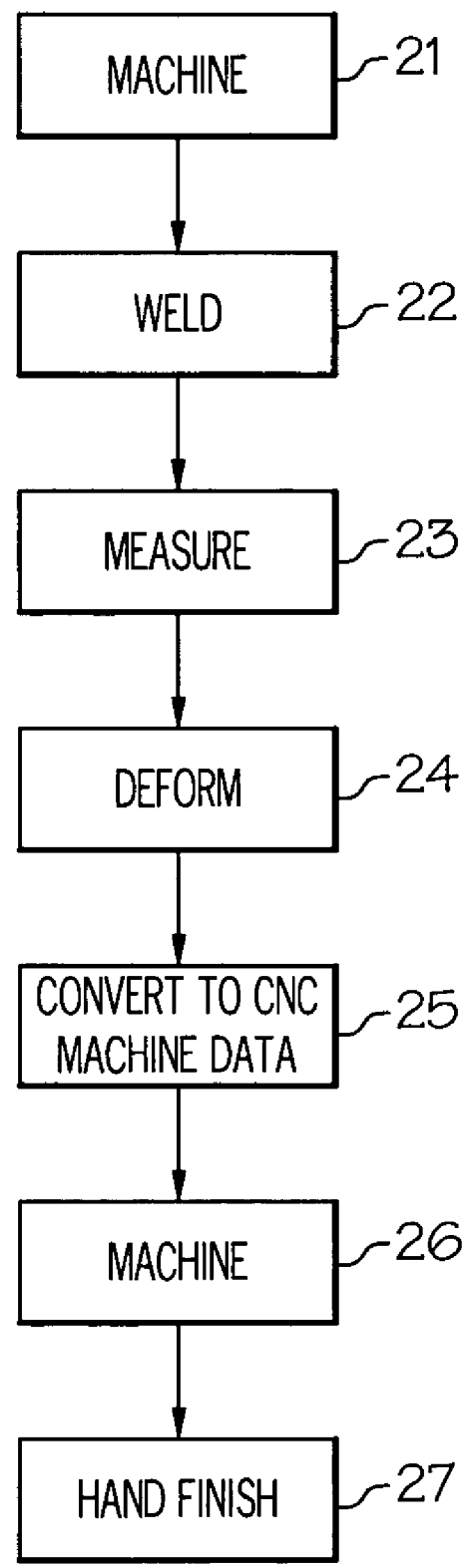
FIG. 2 is an exemplary block diagram showing steps in an adaptive machining and weld repair process according to an embodiment of the present invention.

Referring now to FIG. 2 there is shown a set of steps in a preferred repair process. In a first step 21, damaged material on an engine component is machined. For example damaged leading edges of a blisk are machined so as to remove the damaged portion. The remaining airfoil material should not suffer from any degree of damage that would prevent a restored airfoil from returning to service. In a preferred embodiment, the leading edges 17 (or other damaged area such as a tip) are machined back to predetermined limits. The limits may refer to a degree of machining in a lateral direction starting from the leading edge 17 and a depth direction starting at the top edge 12 of the blade. The predetermined limits provide a margin of safety whereby any damaged material is removed. When an automated machining operation is to be used, it is preferred that all airfoils be machined to the same limits. The limits of machining may be determined by an inspection step of the airfoils. Known methods of machining or grinding may be used for the material removal. It is preferably done by automated means using a multi-axis numerically controlled milling machine.

The portion of the airfoil that has been cut away leaves a newly exposed area on the substrate region of the blade, which is now the remaining mass of the airfoil. The cut away portion thus reveals a weld surface on the substrate region. The weld surface generally follows a contour of a leading edge 17, trailing edge 18, or top edge 12, depending on where the repair is to be performed.

In a further step 22 filler material is deposited by welding techniques on the exposed welding surface. It is generally preferred that laser welding techniques be followed, especially with respect to the superalloys and titanium alloys used in gas turbine engine components. Preferably, filler material is deposited through the use of powder fusion welding. In this system, filler material in powder form is discharged so that it is melted by the laser beam and welds on the desired surface of the workpiece. As is known in the welding art, weld paths and welding parameters are chosen to control thermal input during the welding operation. It is preferred to minimize the amount of heat discharged through the laser to the minimum amount necessary to affect laser welding. Further, the area of the laser beam spot and laser velocity are similarly determined in order to regulate the heat experienced by the substrate. Laser welding is well suited to this kind of control. Thus, the welding operation avoids microcracking in the weld area and the heat affected zone.

Multiple passes may be used to build up a required dimension of material where one pass overlaps a previous pass and successive passes are laid atop a previous pass. Similarly, the method allows for cladding of an area greater than that covered in a single pass by laying successive passes alongside previous passes thus covering a desired area. If needed, repetitions of the laser welding passes can be done in order to achieve a required level of buildup and/or coverage over a required area; this is accomplished by depositing successive layers of filler material on top of one another. Upon conclusion of a first pass, or other passes, the controller can check the thickness of the weld deposit. If needed, additional weld deposits can then be conducted.

Laser welding depositions continue until sufficient material has been deposited. Sufficient material is deposited when the deposited material now occupies the volume of material that had been machined away from the airfoil. Thus, deposited material preferably extends to a point beyond leading edge 17 and top edge 12 of the airfoil in its original condition. The result is a mass of newly deposited material that occupies a repaired region.

In a next step 23 a newly welded piece is analyzed by a Coordinate Measuring Machine (CMM) inspection process. The CMM inspection determines the location of undamaged material on the blisk. Thus, for example, each blade of an impeller or blisk is inspected. The CMM process determines, for each blade, the location of undamaged material. Also, at the conclusion of the CMM measurement, the data establishes an actual airfoil position and shape.

CMM technology is commercially available. A CMM system is able to take precision measurements quickly. A typical machine includes a probe and the related mechanical device (such as an arm, beam, gantry, or combination) to place the probe in a desired location. Physical probes can be used to take measurements at desired points; alternatively lasers and other optics can be used as the means to take the measurements. A CMM platform further includes software whereby measurement data can be recorded, saved, and otherwise digitally manipulated. Measurements can be recorded automatically or manually, though automatic operation is preferred. One preferred form of CMM technology is available through the Zeiss Prismo CMM inspection platform.

In a next step 24 the CMM data is transferred to a blade deformation process, and a blade geometric deformation is performed. In qualitative terms, the blade deformation step is the process of comparing the nominal (blueprint) airfoil geometry with the actual geometry of the airfoil as measured by the CMM. In comparing these two sets of data a third set of data is developed. The third set of data, defining a deformation geometry, in effect provides an interpolation of the measured data. The interpolated or "deformation" data is spread out so as to apply to the various positions that are needed to define a blade face. In this way the deformation geometry defines a new blade geometry. The new blade geometry is thus close to the shape of the blueprint geometry while taking into account measured data. The deformation geometry is then useful in making the later machining step become more accurate and efficient so as to minimize the amount of stock on material left on a restored blade.

A preferred embodiment of processing steps in the deformation method is now described.

Blade Surface Definitions

Figure 3:
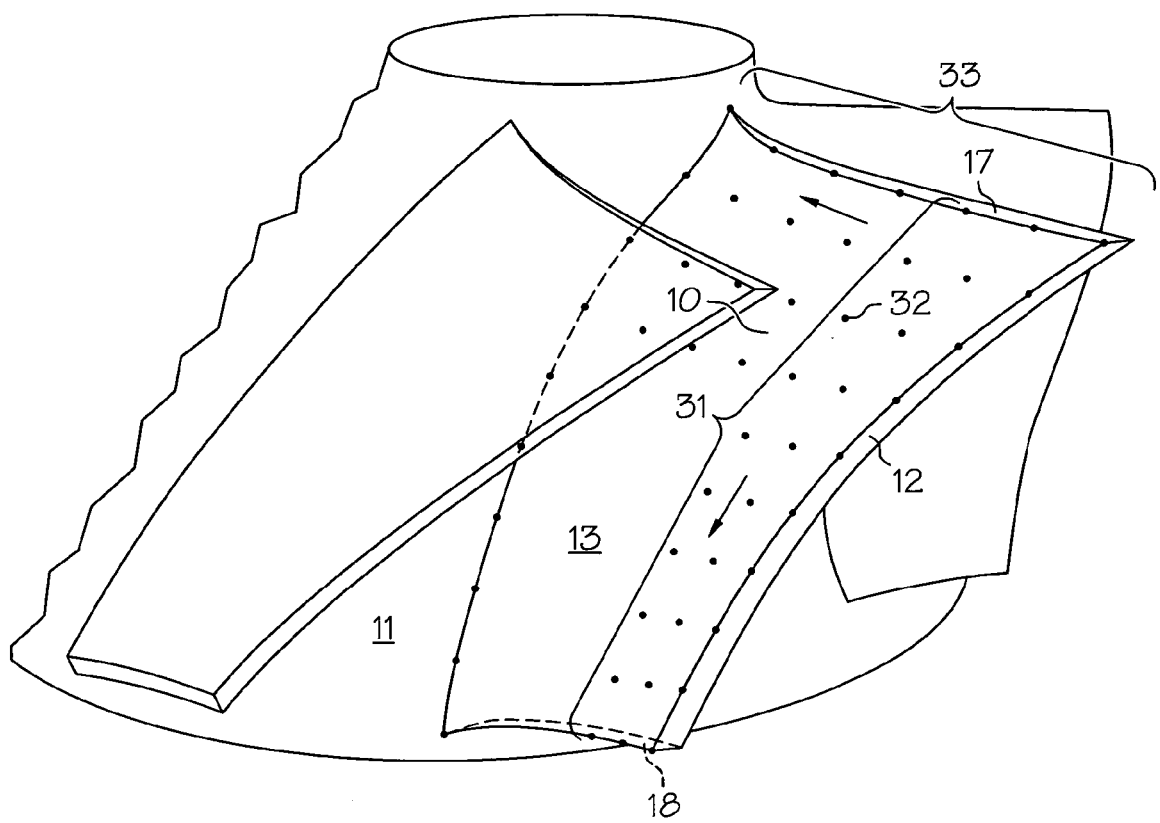
FIG. 3 is a perspective view of an impeller airfoil showing streamlines and cross curves thereon.

The deformation process first uses a set of assumptions to define the nominal blade surface. Blade surface definitions are illustrated in FIG. 3, where there is shown model blade 10.

A blade surface is defined by a sequence of point curves, referred to as streamlines 31 and cross curves 33 of the surface.

The points 32 of the streamlines 31 are ordered from the leading edge 17 to the trailing edge 18 of an airfoil.

The streamlines 31 are ordered from the top edge 12 of the airfoil to the hub 11.

The streamlines 31 for an airfoil have the same number of points 32. Thus, for a given program, a streamline 31 has M number of points 32.

The sequence of corresponding points 32 of each streamline 31 defines a point curve referred to as a cross curve 33 of the surface. A corresponding point is, for example, the set of $5^{th}$ points of each streamline 31, or the set of $10^{th}$ points of each streamline. Thus, a given point 32 on a streamline 31 is also a point 32 on a cross curve 33.

By convention, cross curves 33 run vertically, generally parallel to the blade leading edge 17 and trailing edge 18. Streamlines 31 run generally horizontally, roughly parallel to top edge 12.

The points 33 of the cross curves 33 are ordered from the top edge 12 to the hub 11. The cross curves 33 are ordered from the leading edge to the trailing edge.

As shown by arrows in FIG. 3, streamlines 31 and cross curves 33 extend from top edge 12 to hub 11 and from leading edge 17 to trailing edge 18 such that the blade surface is covered by sufficient points 32 to describe the blade geometry. What results is a matrix of data. Thus, if there are N streamlines 31 of M points 32, there are M cross curves 33 of N points 32.

The consecutive points 32 on each streamline 31 are set close enough that the line segment joining the consecutive points 32 lies within a defined tolerance of the surface. Likewise, consecutive streamlines 31 are set close enough so that a line segment joining the corresponding points 32 between the consecutive streamlines 31 lies within a defined tolerance of the surface.

A surface normal vector at each point of the surface (each point 32 on a streamline 31 or cross curve 33) is determined by computing the cross product of the tangent vectors of the streamline 31 and the cross curve 33 that pass through the point 32.

Finally, the blueprint or nominal data that defines the blade is associated with the points 32 of the blade surface. Thus, the points also have information associated with them that define a designed or specified blade shape. However, as is known in the industry, the actual shape of the blade may not correspond to the nominal data. For a variety of reasons, perhaps the blade shape has been altered during use, or perhaps the blade was not manufactured as designed, the blade may in actuality be different from the nominal blade.

Determining Inspection Nominal Points

In a next series of steps, data is developed that reflect the actual, measured geometry of the blade. The actual data is connected to inspection nominal points, which are positions on the streamline curves and cross curves, though inspection nominal points need not correspond to surface points 32.

Figure 4:
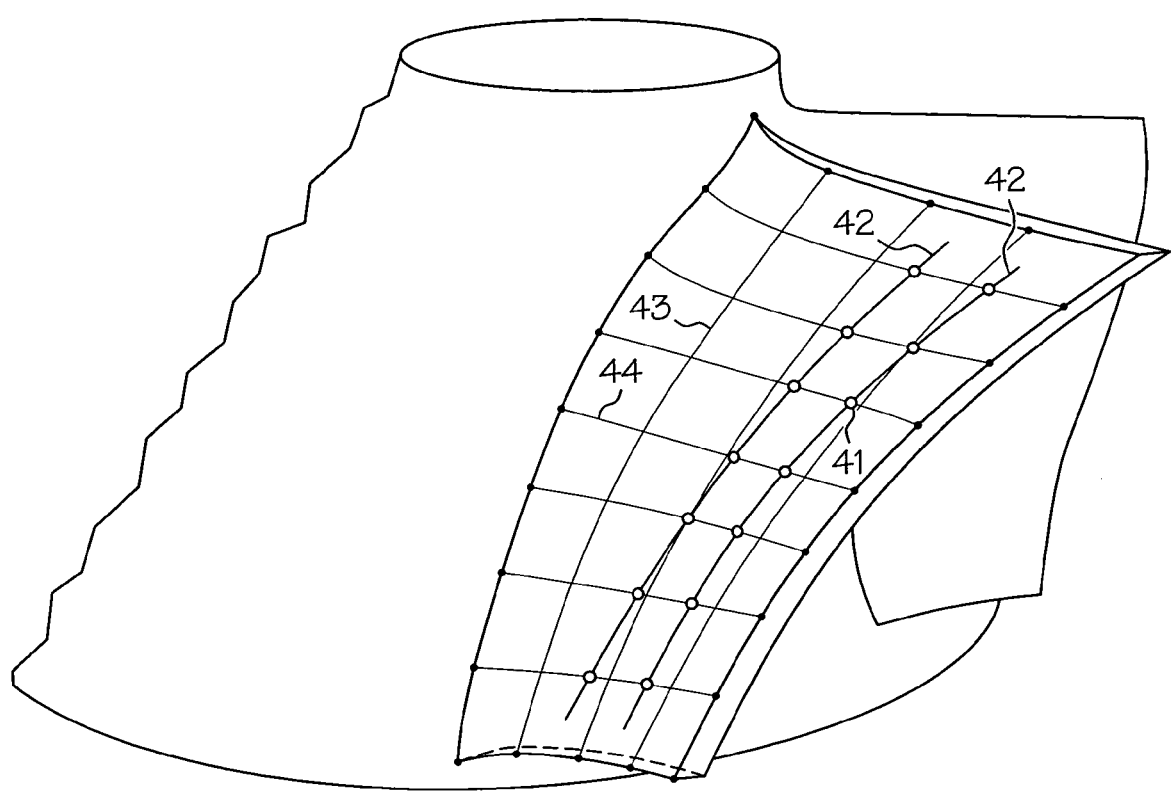
FIG. 4 is a perspective view of an impeller airfoil showing streamlines, cross curves, and inspection curves thereon.

As shown in FIG. 4, a set of inspection nominal points 41 define inspection curves 42. As illustrated, inspection curves 42 thus intersect streamlines 43 and cross curves 44 at inspection nominal points 41.

In one embodiment, an inspection nominal point is a known point where there has been an inspection and is also a point that lies on a streamline curve or cross curve. Any method may be used to set an inspection nominal point so long as it satisfies the definition criteria.

In a second embodiment, inspection nominal points are computed. This is accomplished by calculating the geometric intersection of surfaces of revolution with streamlines and cross curves. The points of intersection are inspection nominal points. The inspection nominal points, by definition, lie on a streamline or cross curve. And measurement data is attached to these points in a later step.

The surface of revolution used in the geometric intersection is preferably a rotation of a curve that is patterned from a known engine component, for example a shroud. (In a gas turbine engine a shroud is a stationary component of the engine housing that defines a flow path in conjunction with an impeller or other rotor.) A curve may be defined by projecting points a set distance normal to the shroud curve, along a plane run through the center line of the engine. This projection curve is then rotated about the center line. The rotation is a three dimensional constructed surface of rotation. A series of surfaces of rotation may be defined by first defining a set of curves that are at varied normal distances from the shroud curve. In one embodiment, by way of example only, a set of curves are defined by setting points 50, 100, 150, 200, 250, etc. thousandths of an inch normal to the shroud curve. In this manner, surfaces of revolution can be constructed that will intersect with streamlines and cross curves of the nominal blade. The points of intersection are inspection nominal points. It will be noted that, by definition, inspection nominal points lie on streamlines and cross curves; however, they need not be the same as surface points 32.

Other means may be used to define a surface of rotation. Any curve which can describe a surface of rotation that intersects with blade streamlines and cross curves may be used to define the surface of rotation. In an alternative embodiment, curves to be rotated are established by measuring a set distance normal from the centerline of the blisk or impeller. In still a further embodiment, curves to establish a surface of rotation are defined by setting points on some function curve that is projected from an engine structure such as a center line or shroud. As will be further explained below, the surface of rotation may be constructed so as to obtain intersections, and thus inspection nominal points, at preferred locations with respect to the airfoil surface.

In a next step, the actual blade is measured at inspection nominal points. It will be appreciated that the preferred process of setting an inspection nominal point (intersecting a surface of revolution with a streamline and cross curve) is done so that the inspection nominal point is set at a position that may be referenced by a CMM system. Thus, for example, by setting a given surface of revolution 250 thousandths of an inch from a shroud, this also sets a spatial position that can be mimicked or identified by the CMM system. In this manner the CMM system takes measurements at the defined inspection nominal points. Actual data is thus associated with these inspection nominal points.

It will be appreciated that the greater the number of inspection nominal points, the better will be the measurement of the actual blade shape. However, an increased number of inspection points carries increased time and expense, and further requires increased calculation capacity. Thus, it is preferred in one embodiment to have only so many inspection nominal points as is needed to adequately define actual blade curvature in the region of the edge repair.

The Deformation Calculation

A final set of calculations develops the deformation geometry. In summary this comprises taking actual data associated with each inspection nominal point, and then interpolating values to be associated with each streamline or cross curve point that lies adjacent to the inspection nominal point. Linear interpolation is preferably used, though other interpolation systems are also acceptable. A distribution of deviations is thus computed along the streamlines and cross curves by linearly interpolating the deviations using the polygonal arc length as the independent variable. The points of the deformed surface are computed by projecting at each surface point the deviation along the surface normal unit vector.

The deformation system includes a preferred approach for dealing with edge conditions on the airfoil surface. In order to construct a blade shape based on actual data, it is desired to measure inspection points on the unwelded surface of the blade. That portion of the blade that has welding material on it, for example near one of the edges, would not conform to a smooth airfoil shape because of the welding material. Thus, the blade is not measured where it has been welded. Thus, in setting the inspection points, it is preferred to begin some set distance away from an edge feature. For example, inspection points may be set to begin 0.100 inch away from an edge in order to avoid welding material. The first inspection point therefore begins some set distance away from the edge feature. Then, when calculating deviations, the surface points beyond the "first" inspection point (points between the "first" inspection point and the edge feature) are assumed to have the same deviation as the "first" inspection point. Data interpolation is calculated using that assumed deviations. Similarly, the deviations for the points beyond any "last" inspection point are assumed to be the deviation of the "last" inspection point. Alternatively for the points beyond the last inspection point, the deviations are the obtained by interpolating between the deviation at the last inspection point and zero (0.0) unless a boundary deviation condition has been defined to be used in place of zero (0.0). When this step is completed, a deviation has been defined for each point of the surface.

It will be noted that in this deformation method the tip feature is generally parallel with the streamlines. To improve computational stability, the intersection calculations in the tip area use the surface cross curves. Similarly the leading edge and trailing edge features are generally parallel with the cross curves. To improve the computational stability, the intersection calculations in the area of the leading edge and the trailing edge use the surface streamlines.

Referring again to FIG. 2, the next step in the adaptive machining and weld repair process is step 25. The data for the new, deformed blade geometry is transferred to a machining software. The machining software converts the geometric data into machining commands. Known machining software may be used. Preferably, it is a machining software that enables a CNC code to direct customized machining. The machining software, using the deformation data, can generate tool paths in order to machine the welded blade. A typical tool path may call for multiple machining of a leading edge, with each machining pass removing portions of the weld material.

In step 26, the machining step is executed. Machine the airfoil to the best theoretical shape. It is preferred to perform this machining such that it leaves less than 5 thousandths of an inch (0.005") of material stock on.

Figure 5:
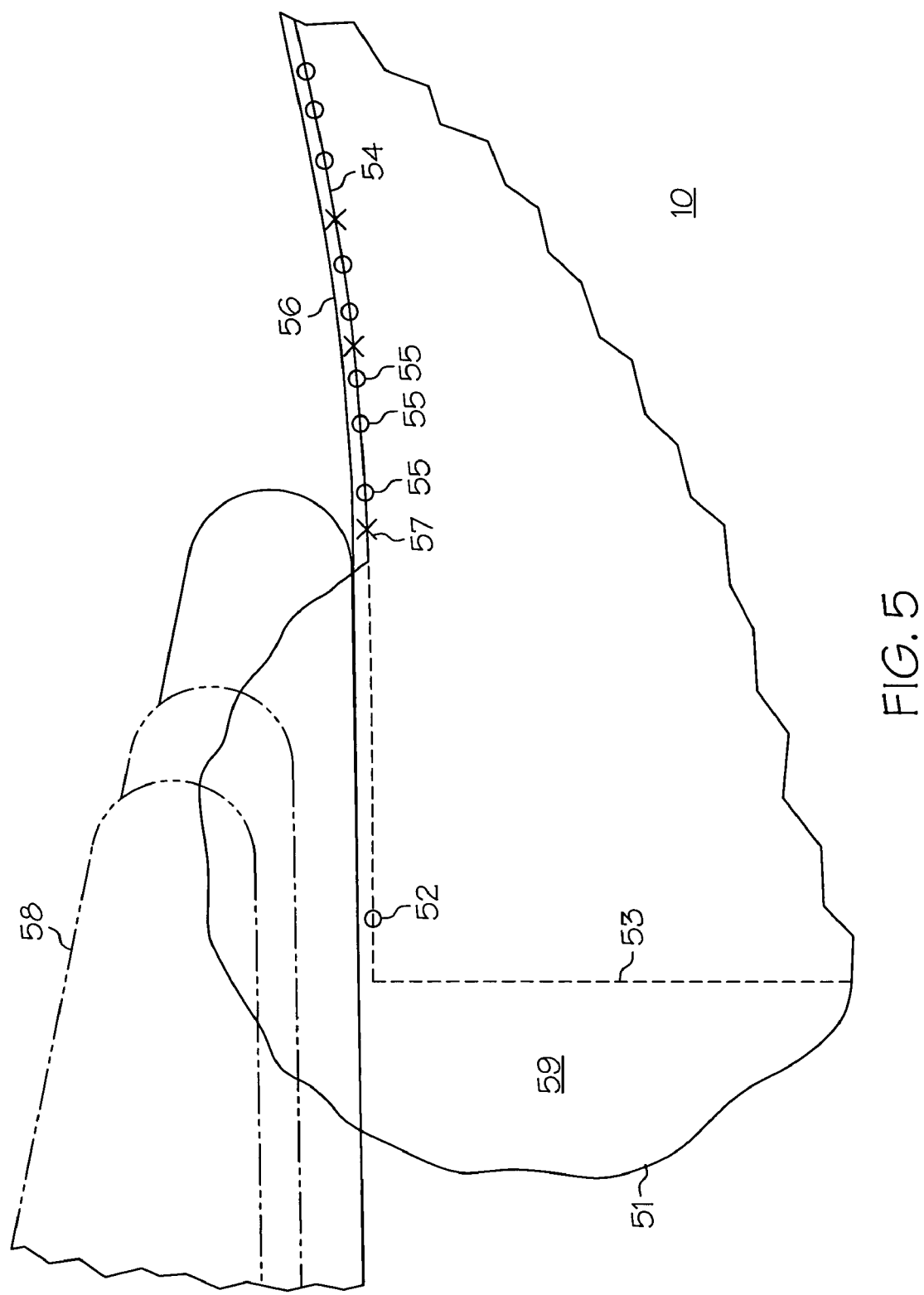
FIG. 5 is a close up view of an impeller airfoil showing a welding bead, an ideal geometry, a deformation geometry, and exemplary machining steps according to an embodiment of the present invention.

Several features of the adaptive machining and weld repair process, including the machining step, are illustrated in FIG. 5. An airfoil 10 is illustrated in cross-section, viewed head-on from the leading edge of the impeller. Thus, the airfoil shape illustrated is not the leading edge, but rather is a cross-section taken at some mid-point of the airfoil. The airfoil top edge has been welded, and a weld bead 51 rests on the airfoil. An ideal contour 52, illustrates the hypothetical blueprint structure of the airfoil. This ideal contour includes the airfoil top edge 53 and profile edge 54. The profile edge 54 thus corresponds to a cross curve of the ideal geometry. Surface points 55 are illustrated on the cross curve. Depicted slightly above the ideal contour 52 is the actual contour 56. Thus, in this example, the actual blade has a shape that does not match the ideal shape (for whatever reason). Inspection points 57 are also noted on the ideal contour with X's. Numerical values, +0.005, +0.004, +0.003, etc., are associated with each inspection point. These numerical values indicate the measured deviation at the inspection point between the ideal and actual shapes.

Still referring to FIG. 5, there is also shown how a deformation contour is extended to that portion of the airfoil that is presently covered by the weld bead 51. It is noted that measurements for actual data are preferably taken at locations where no weld material has been deposited. Thus, for that small portion of the airfoil covered by welding material, a deformation curve must be extended, from that portion of the deformation curve where actual data has been measured and interpolated, as described in the deformation process.

FIG. 5 also illustrates exemplary machining steps that may be ordered. The goal is to machine the blade to a best possible shape that is consistent with the actual data, while also leaving a minimum of material stock on. A cutter 58 is illustrated in shadow. The series of cutters 58 merely illustrates the hypothetical succession of cutting steps. Thus, in a first pass cutter 58 removes one portion of weld bead 51. The weld bead 51 is further trimmed in a next step. Finally, weld bead 51 is trimmed down to a point that closely approximates the deformation line. Thus, a blade shape is produced with little material left for hand finishing, and its shape, where machined, is also consistent with the actual configuration of the blade. It is finally noted that the portion of the weld bead 51 in FIG. 5 that is to the left of the top edge 53, noted as region 59, is preferably trimmed in a separate operation. This trimming of the top edge is preferably done to a set height curve.

At this point, step 27, the component may be hand finished. However, the amount of manual machining that is needed is reduced from methods that do not employ development of a deformation geometry. Preferably, less than 0.005 inch of material is left over the deformation surface.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for restoring a worn edge of an airfoil comprising the steps of:
   machining away damaged material from a damaged airfoil edge so as to expose a weld surface;
   laser depositing new material on the weld surface so as to create a weld-repaired airfoil having actual dimensions;
   automatically measuring the actual dimensions of the weld-repaired airfoil using a CMM system so as to generate an actual geometry;
   deforming the actual geometry so as to develop a deformation geometry by:
      defining a set of streamlines on an airfoil surface,
      defining a set of cross curves that intersect one or more of the streamlines thereby establishing surface points at each such intersection,
      associating nominal surface data with each surface point,
      defining a set of inspection nominal points that fall on streamlines and cross curves,
      measuring an actual blade shape at each inspection nominal point to establish shape deviation data, and
      interpolating the shape deviation data with reference to the surface points; and
   machining the component according to the deformation geometry.

2. The method according to claim 1 wherein the step of measuring the component further comprises measuring using a coordinate measuring machine.

3. The method according to claim 1 further comprising the step of generating a tool path using machining software.

4. The method according to claim 1 wherein the step of laser depositing new material comprises laser cladding.

5. The method according to claim 1 wherein the step of machining away includes machining the component so as to leave less than 5 thousandths of an inch stock on.

6. The method according to claim 1 further comprising the step of hand finishing the machined component.

7. The method according to claim 1 wherein the steps are performed in the order written.

8. The method according to claim 1 further comprising the step of converting the deformation geometry to a CNC machining data.

9. The method according to claim 1 wherein the step of machining the component further comprises automated machining according to a CNC machining data.

10. The method according to claim 1 wherein the step of machining away damaged material from a damaged airfoil edge comprises machining away a damaged leading edge.

11. The method according to claim 1 wherein the step of machining away damaged material from a damaged airfoil edge comprises machining away a damaged trailing edge.

12. The method according to claim 1 wherein the step of machining away damaged material from a damaged airfoil edge comprises machining away a damaged top edge.

13. A method for restoring a worn edge of an airfoil comprising the steps of:
   machining away damaged material from a damaged airfoil edge so as to expose a welding area;
   laser depositing new material on the welding area so as to create a weld-repaired airfoil;
   defining a set of streamlines on an airfoil surface;
   defining a set of cross curves that intersect one or more of the streamlines thereby establishing surface points at each such intersection;

associating nominal surface data with each surface point;

defining a set of inspection nominal points that fall on streamlines and cross curves;

automatically measuring the actual dimensions of the airfoil using a CMM system at each inspection nominal point to establish shape deviation data;

interpolating the shape deviation data with reference to the surface points so as to create a deformation geometry;

converting the deformation geometry to a machine operable code;

machining the component according to the deformation geometry; and hand finishing the airfoil.

14. The method according to claim 13 wherein the step of machining the component further comprises machining the component so as to leave less than 0.005 inch of material stock on.

15. The method according to claim 13 further comprising the step of transferring the deformation geometry to an automated machining computer.

16. The method according to claim 13 further comprising the step of generating a tool path using machining software.

* * * * *